Patented Dec. 5, 1939

2,182,209

UNITED STATES PATENT OFFICE 2,182,209

EGG PRODUCT

Roy C. Newton and Leon D. Mink, Chicago, Ill., assignors to Industrial Patents Corporation, Chicago, Ill., a corporation of Delaware No Drawing. Application November 23, 1936, Serial No. 112,292

18 Claims. (Cl. 99—210)

This invention relates to a new food product composed of egg material and an added substance which serves to modify the characteristics of the egg material.

One of the objects of the invention is to provide an improved dried egg product which may be readily reconstituted and which possesses the property of producing a reconstituted egg product of improved keeping qualities.

Another object of the invention is to provide an improved dried egg material which may be reconstituted and be used in the improvement of ice cream mixes whereby an increased overrun may be secured in the manufacture of ice cream in which the reconstituted dried egg material of the present invention is incorporated.

Another object of the invention is to provide an improved dried egg product which upon reconstitution may be employed to improve the creaming quality of cake batters in which the reconstituted improved egg product is incorporated.

Other objects of the invention will be apparent from the description and claims which follow.

As has been pointed out in the copending application of Roy C. Newton and Donald P. Grettie, Serial No. 629,998, filed August 22, 1932, shortening containing as an addition product monoacid glycerides of higher fatty acids, diacid glycerides of higher fatty acids, and mixtures thereof, exhibits a marked improvement in creaming qualities rendering it valuable in the making of cakes.

It has also been pointed out in the copending application of Warren D. Roth, Leo C. Brown, and Guy W. Phelps, Serial No. 673,476, entitled Method of manufacturing ice cream and the product thereof, filed May 29, 1933, which application was continued as application Serial No. 754,842, filed November 26, 1934, and which latter application issued December 22, 1936 as Patent No. 2,065,398, that the addition of these substances to ice cream mixes greatly improves the overrun.

The product of the present invention carries over into ice cream mixes and cake batters the desirable effect of these glycerine derivatives.

In our copending application entitled Egg product, Serial No. 744,863, filed September 20, 1934, we describe and claim an improved frozen egg product.

The present invention provides a dried egg product which may be reconstituted and employed in the manufacture of cakes other than cakes of the angel or sponge type, or may be employed in the manufacture of ice cream in a manner similar to that in which the product of our last mentioned application may be employed.

Large quantities of eggs are removed from shells, placed in cans and frozen to be shipped to the trade as needed. Large quantities of eggs are separated after being broken out of the shell into whites and yolks, the whites being particularly useful for the angel cake baking trade and the yolks for mayonnaise. Similarly, large quantities of eggs are packed after being broken out of the shell without separation of the yolks and whites, being ordinarily designated in the trade as mixed eggs or broken whole eggs. Such egg material is usually frozen solid and stored in the frozen state to be thawed out by the consumer for use.

Freezing eggs and carrying them in refrigerated storage is expensive, but such eggs have been preferred to eggs stored in dried condition without refrigeration, because of the difficulty involved in reconstituting dried egg material by the addition of moisture to permit the use of the egg material in the manner in which untreated eggs are employed. We have discovered that dried eggs may be readily reconstituted if there is added to the product a small amount of monoacid or diacid glyceride, that is an ester of a polyhydric alcohol with a long chain fatty acid in which one or more alcoholic groups remain free.

Specifically, the product may be made by intimately admixing with dried egg material a sufficient quantity of glyceryl monostearate to represent one per cent of the egg material after reconstitution with water. Dried egg material prepared in this manner is improved in that it may be reconstituted with ease and the reconstituted product does not tend to water out.

Reconstituted egg yolks prepared in this manner improved the well-known effect of egg yolks in producing overrun in an ice cream mix.

Furthermore, reconstituted dried egg material prepared in this manner may be advantageously employed in the production of those types of cakes in which the ratio of sugar to shortening is very high and in which a leavening agent is used to increase volume. The fineness of texture and volume of the finished cake is improved due to the effect of the monoacid or diacid glyceride on the consistency and type of the creamed mix by producing the proper consistency so that the expanded cells produced by the leavening agent when the cake is baked tend to remain in a very fine state of division and eventually set to give a more finely divided texture and consequent tenderness in the cake.

The substance added to the dried egg material may be the monoacid or diacid glyceride prepared by the reaction of glycerol with a fatty acid. The reaction product of glycerol and a suitable triacid glyceride may also be employed. The substance used is an ester of fatty acid and polyhydric alcohol having one or more free alcoholic hydroxyl groups on the polyhydric alcohol component of the ester. Specifically, the substance may be monoacid glyceride, diacid glyceride, monoacid ester of ethylene glycol, monoacid ester of diethylene glycol or any ester of polyhydric alcohol and fatty acids characterized by having one or more free alcoholic hydroxyl groups. A suitable substance of this class is monoacid or diacid glyceride.

As is well known, such material, namely, glyceryl ester of fatty acid having a free glyceryl alcohol group, is a fragment of a fat molecule possessing one or more free alcohol groups and one or more ester groups. More specifically, the material may be the monoacid or diacid glyceryl esters of a higher fatty acid, or a mixture of both. Both the monoacid and the diacid glycerides of a higher fatty acid are esters of the alcohol "glycerol" and a higher fatty acid and each have a free alcohol group in each molecule.

This invention is not concerned with the preparation of the monoacid or diacid glyceride of a higher fatty acid or of the other substances herein described as valuable addition products with dried egg material to provide a readily reconstitutable dried egg material, and it is not believed necessary to describe a particular method of preparation of such substances.

The monoacid or diacid glyceryl ester of various fatty acids may be employed but by way of illustration the monoacid or diacid glyceryl ester of stearic acid may be mentioned as preferable.

The term "higher fatty acid" as used in the claims is used in a restricted sense to include those fatty acids found in such normal fats as butter, cocoanut oil, cottonseed oil, peanut oil, hog lard, beef fat, mutton fat, and other edible fats and oils.

We claim:

1. An egg product consisting essentially of dried egg material and a glyceryl ester of a higher fatty acid having a free glyceryl alcohol group.

2. An egg product consisting essentially of dried egg yolk material and a glyceryl ester of a higher fatty acid having a free glyceryl alcohol group.

3. An egg product consisting essentially of dried egg material and a substance selected from the class consisting of glyceryl monostearate, glyceryl distearate, and mixtures thereof.

4. As an article of manufacture, a new food product consisting essentially of dried egg material containing a small percentage of glyceryl ester of a higher fatty acid having a free glyceryl alcohol group.

5. As an article of manufacture, a new food product consisting essentially of dried egg material containing a small percentage of higher fatty acid diacid glyceryl ester.

6. As an article of manufacture, a new food product consisting essentially of dried egg material containing a small percentage of higher fatty acid monoacid glyceryl ester and higher fatty acid diacid glyceryl ester.

7. An egg product consisting essentially of dried egg material and a substance selected from the class consisting of glyceryl esters of higher fatty acids having a free glyceryl alcohol group and higher fatty acid esters of ethylene glycol and diethylene glycol having a free glycol alcohol group.

8. An egg product consisting essentially of dried egg yolk material and a substance selected from the class consisting of glyceryl esters of higher fatty acids having a free glyceryl alcohol group and higher fatty acid esters of ethylene glycol and diethylene glycol having a free glycol alcohol group.

9. An egg product consisting essentially of dried egg material and a higher fatty acid ester of ethylene glycol having a free glycol alcohol group.

10. An egg product consisting essentially of dried egg yolk material and a higher fatty acid ester of ethylene glycol having a free glycol alcohol group.

11. An egg product consisting essentially of dried egg material and a higher fatty acid ester of diethylene glycol having a free glycol alcohol group.

12. An egg product consisting essentially of dried egg yolk material and a higher fatty acid ester of diethylene glycol having a free glycol alcohol group.

13. As an article of manufacture, a new food product consisting essentially of dried egg material and a substance selected from the class consisting of glyceryl esters of higher fatty acids having a free glyceryl alcohol group and higher fatty acid esters of ethylene glycol and diethylene glycol having a free glycol alcohol group.

14. As an article of manufacture, a new food product consisting essentially of dried egg yolk material and a substance selected from the class consisting of glyceryl esters of higher fatty acids having a free glyceryl alcohol group and higher fatty acid esters of ethylene glycol and diethylene glycol having a free glycol alcohol group.

15. As an article of manufacture, a new food product consisting essentially of dried egg material and a higher fatty acid ester of ethylene glycol having a free glycol alcohol group.

16. As an article of manufacture, a new food product consisting essentially of dried egg yolk material and a higher fatty acid ester of ethylene glycol having a free glycol alcohol group.

17. As an article of manufacture, a new food product consisting essentially of dried egg material and a higher fatty acid ester of diethylene glycol having a free glycol alcohol group.

18. As an article of manufacture, a new food product consisting essentially of dried egg yolk material and a higher fatty acid ester of diethylene glycol having a free glycol alcohol group.

ROY C. NEWTON.
LEON D. MINK.